Nov. 11, 1924.

E. M. GLASGOW

CONDUIT FITTING

Filed Sept. 21, 1922

1,514,612

Inventor
Ernest M. Glasgow.
By his Attorneys
Townsend+Decker.

Patented Nov. 11, 1924.

1,514,612

UNITED STATES PATENT OFFICE.

ERNEST M. GLASGOW, OF PORT CHESTER, NEW YORK, ASSIGNOR TO RUSSELL & STOLL COMPANY, OF NEW YORK, N. Y., A CORPORATION OF NEW YORK.

CONDUIT FITTING.

Application filed September 21, 1922. Serial No. 589,537.

*To all whom it may concern:*

Be it known that I, ERNEST M. GLASGOW, a citizen of the United States, and a resident of Port Chester, in the State of New York, have invented certain new and useful Improvements in Conduit Fittings, of which the following is a specification.

My invention relates to conduit fittings adapted to support therein and protect electrical or other conductors or cables or pull wires and in its application relates more particularly to those fittings which have one or more bends or elbows therein to permit the cable or conductor etc. to be run in the proper direction depending on installation requirements.

The principal object of the invention is the production of a conduit fitting having a construction permitting a cable, conductor or pull wire to be easily inserted therein and drawn therethrough, thus eliminating possible injury to the cable and any difficulty of installation.

Further objects and advantages of the invention will appear from the accompanying description, the invention consisting in the novel parts and combinations thereof hereinafter more particularly described and then specified in the claims.

Figure 1:
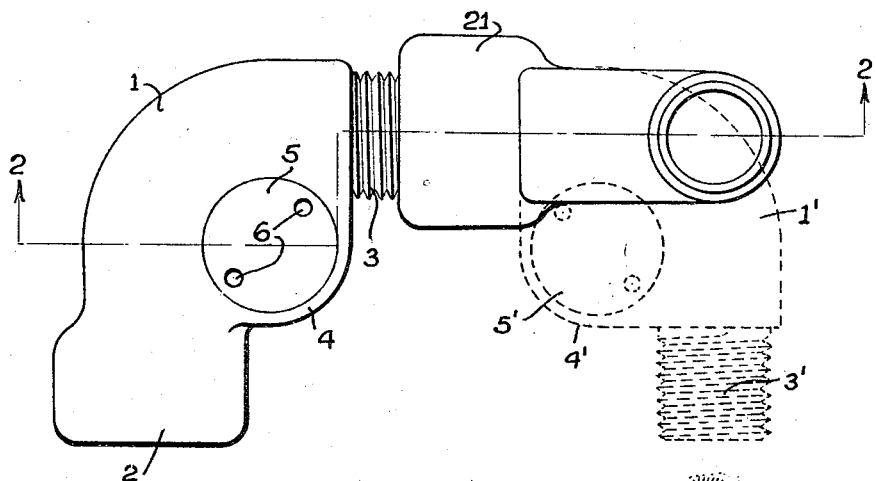
Fig. 1 is a front elevation of two L forms of conduit fitting identical in construction and which are coupled or screwed together and which show my invention.

Referring in detail to the drawings:

1 indicates the hollow body of the conduit fitting which is bent or of L form, one leg of which terminates in an enlarged interiorly screw-threaded end 2 while the other leg terminates preferably in a screw-threaded extension 3. The body 1 is also provided with an enlargement 4 integral therewith and intermediate the end 2 and extension 3, the opposite walls of said enlargement having annular screw-threaded openings receiving closure members 5. Said closure members comprise circular plates whose peripheries are screw-threaded, said inclined walls provided with spanner holes 6 or slots whereby they may be conveniently screwed or pressed "home" or removed when so desired. They are also provided with depressions 7 having inclined walls forming bearings for the bevelled ends 8 of a pin 9, said pin carrying thereon a roller 10. When a cable, conductor or pull wire is inserted through the end 2 it rides over the roller 10 thereby eliminating friction and making it easy to pull the cable through the extension 3.

Figure 2:
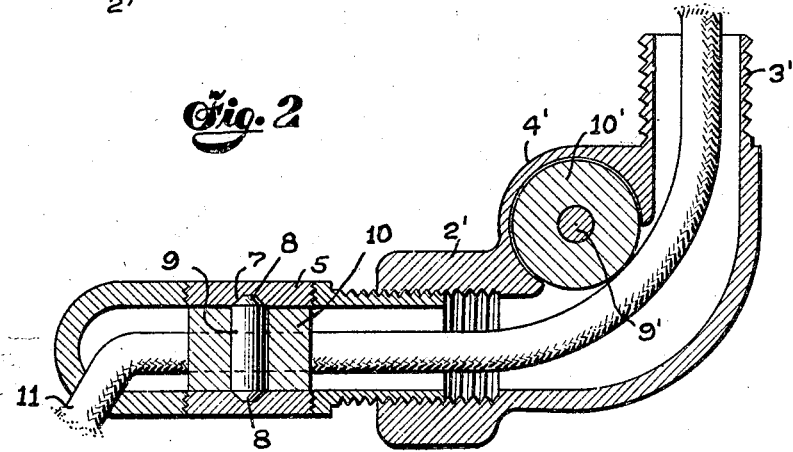
Fig. 2 is a section on the line 2—2 of Fig. 1.

At the right hand side of Figs. 1 and 2 I have shown a conduit fitting identical in construction to the one just described, its parts being designated by reference numerals of the corresponding parts of the first conduit fitting with the exception that the reference numerals have been primed. It will be noted that the end 2' of the second fitting has been screwed to the extension 3 of the first fitting and the cable or conductor 11 is shown passing through both fittings and over the roller in each of them. In a case of this character, were my invention not employed, considerable difficulty might be met in passing the cable through the fittings because of friction which also might result in injury to the cable due to the scraping thereof against the inner walls of the fittings.

Figure 3:
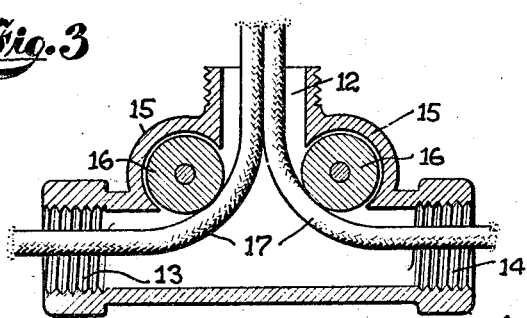
Fig. 3 is a section through a modification showing the invention applied to a T form of conduit fitting.

In the modification shown in Fig. 3 the conduit fitting is shown in the form of a T provided with an opening 12 in the head and end openings 13 and 14 respectively. The body of the fitting is also provided with enlargements 15 in which rollers 16 are mounted which are identical in construction with the rollers of the preferred form of the invention. Cables 17 are shown passing through the end openings 13 and 14, over the rollers and through the opening 12.

What I claim as my invention is:—

1. A conduit fitting comprising an elbow having screw-threaded openings in opposite walls thereof and in alignment with each other, removable closure members comprising circular plates screwed within said openings, a removable pin supported by said closure members and a roller carried by said pin.

2. A conduit fitting comprising an elbow having openings in opposite walls thereof, removable closure members screwed within said openings and provided with depressions having inclined walls, a pin provided with bevelled ends received by said depressions and a roller carried by said pin.

Signed at New York, in the county of New York and State of New York, this 20th day of September, A. D. 1922.

ERNEST M. GLASGOW.

Witnesses:
F. B. TOWNSEND,
GEORGE E. BROWN.